July 16, 1940.  R. W. MILLER  2,207,751
LUBRICATOR AND SEAL
Filed July 3, 1936   4 Sheets-Sheet 1

Inventor
Rudolph W. Miller

By Brown & Phelps
Attorneys

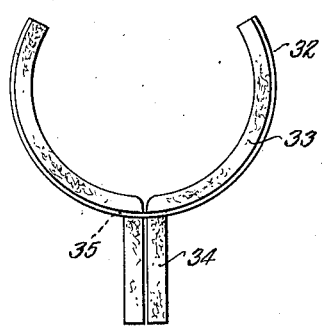
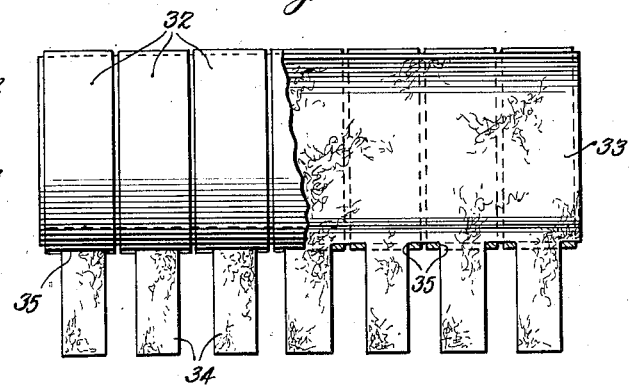
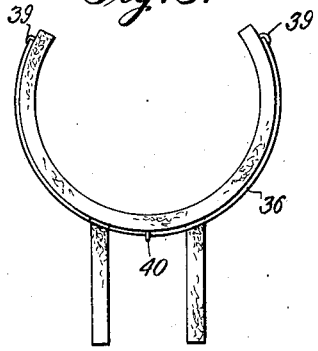
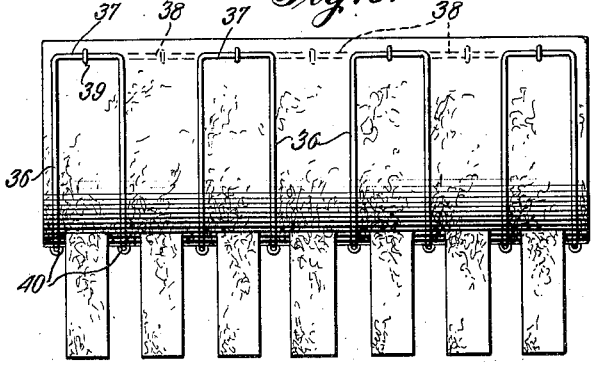
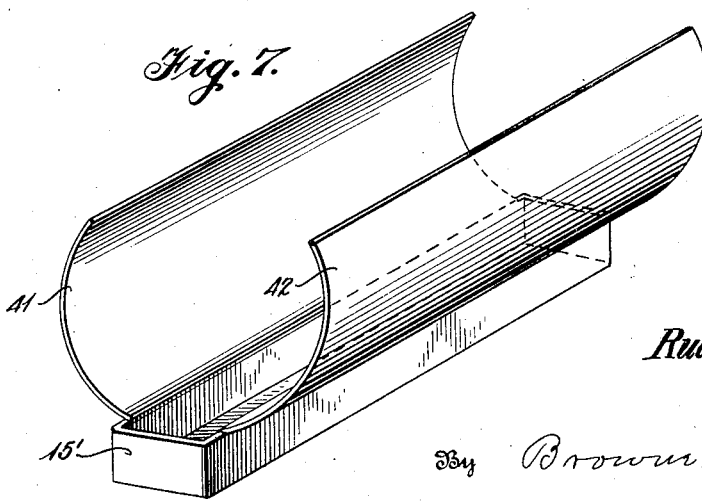

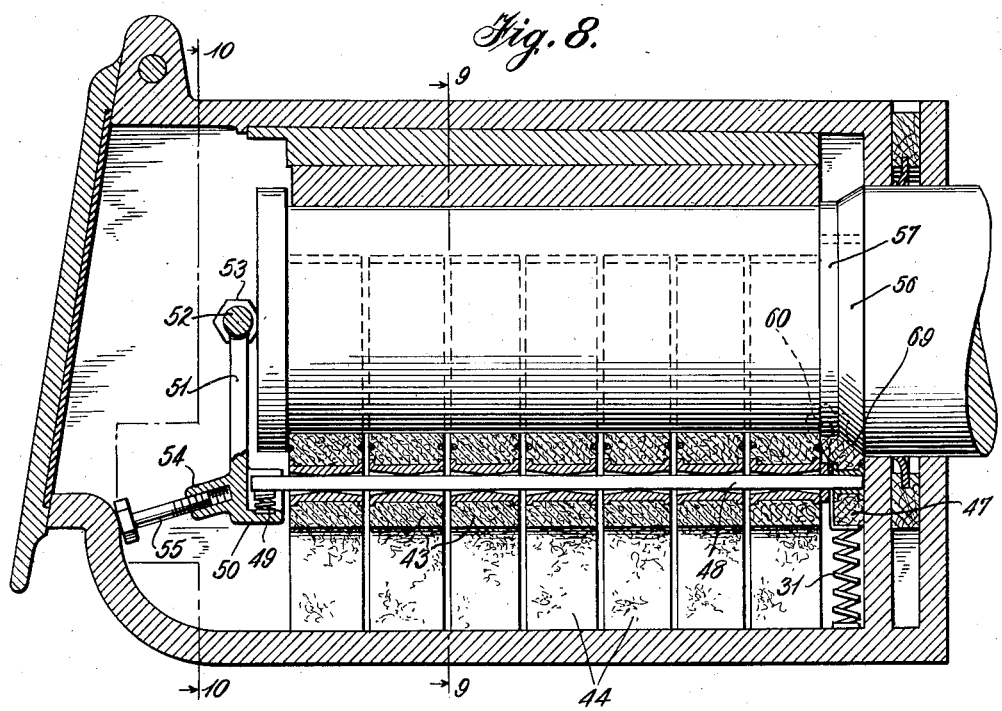
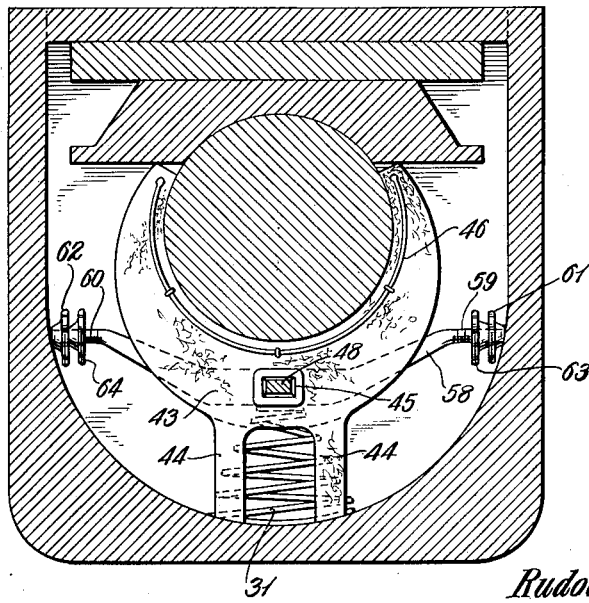

July 16, 1940.  R. W. MILLER  2,207,751
LUBRICATOR AND SEAL
Filed July 3, 1936   4 Sheets-Sheet 4

Inventor
Rudolph W. Miller

By Browne & Phelps
Attorneys

Patented July 16, 1940

2,207,751

UNITED STATES PATENT OFFICE 2,207,751

LUBRICATOR AND SEAL

Rudolph W. Miller, Winona, Minn.

Application July 3, 1936, Serial No. 88,880

5 Claims. (Cl. 308—88)

The invention relates to lubricators and has as an object the provision of a simple form of lubricator which may be installed in existing journal boxes.

It is an object of the invention to provide a lubricator which in one form will support itself upon the journal.

It is a further object of the invention to provide a lubricator which will be operative with a small reserve of oil.

It is a further object of the invention to provide a lubricator having means to seal the opening in the journal box through which the enlarged end of the journal is inserted during assembly.

Further objects of the invention will appear from the following description when read in connection with the accompanying drawings showing illustrative embodiments of the invention, and wherein:

Fig. 3 is a transverse section, and Fig. 4 is a side elevation, partly broken away of a different form of the invention;

Fig. 5 is a transverse section, and Fig. 6 is a side elevation of a further form of the invention;

Fig. 7 is a perspective view of a still further form of the invention;

Fig. 8 is a view corresponding to Fig. 1 of a still further form of the invention;

Figs. 9 and 10 are vertical transverse sections on the corresponding section lines of Fig. 8;

Figure 1:
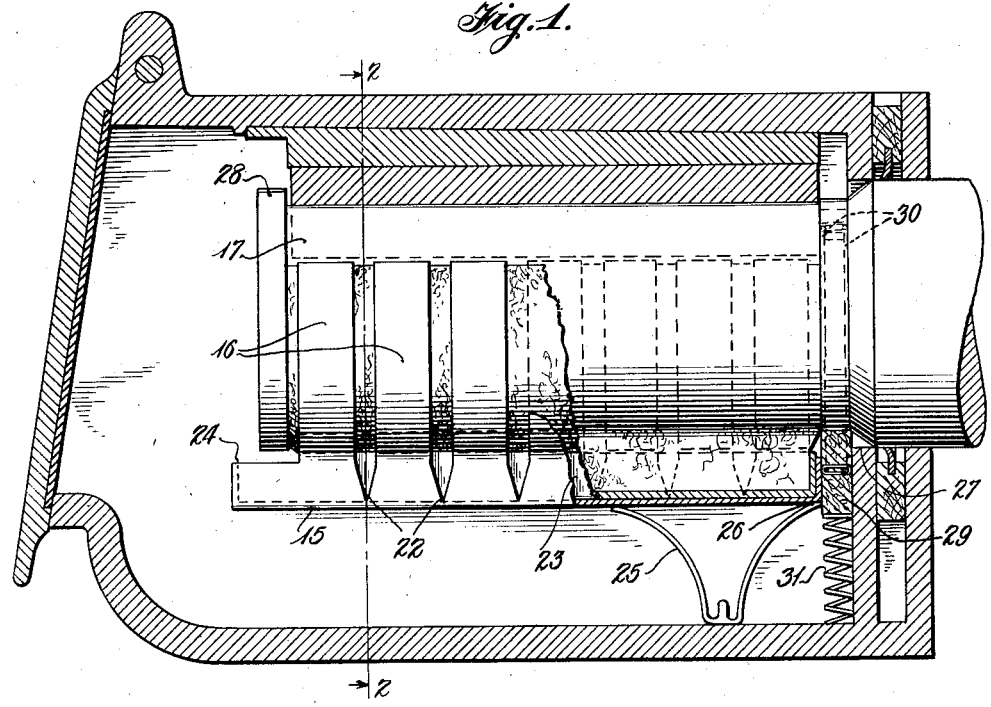
Figure 1 is a central vertical section through the journal box showing the journal and lubricator in side elevation.
Figure 2:
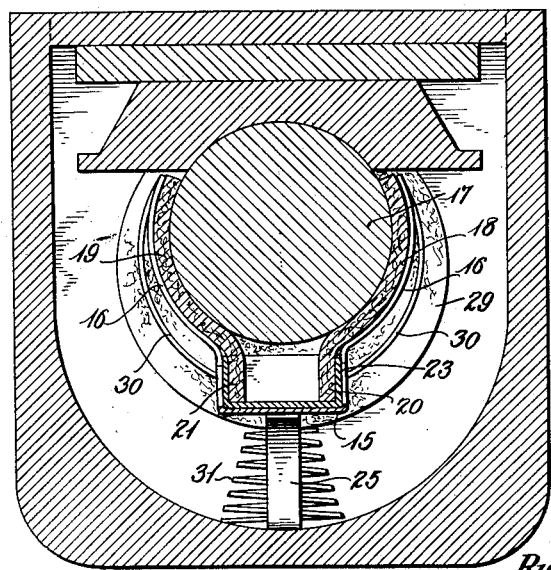
Fig. 2 is a vertical transverse section on line 2—2 of Fig. 1.
Figure 10:
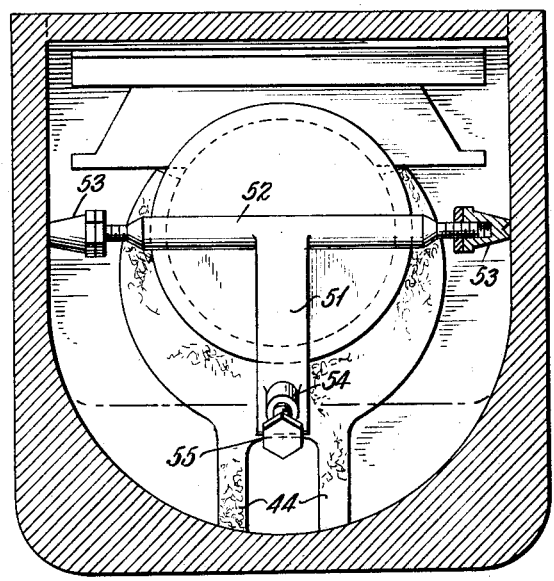

As shown in Figures 1 and 2 the lubricator comprises a trough 15 for oil, and supporting and pad-pressing spring members 16 shown as integral at their lower ends with the side walls of the trough 15.

To apply the lubricant to the surface of the journal 17 there are shown absorbent pad members 18, 19 which may be continuous throughout the length of the journal and which are shown as extending downwardly at 20, 21 to dip into oil in the trough 15.

By virtue of the fact that the springs 16 as well as the pads 18, 19 extend well above the horizontal diameter of the journal 17, and that the springs 16 clasp the journal, in other words exert pressure thereagainst, the lubricator will be self-supporting upon the journal.

In some existing journal boxes the dimensions are such that to insert a lubricator of this type the same must be flexed longitudinally. To this end the spring members 16 are separated from each other and the separations are shown as extending to the points 22 closely adjacent to the bottom of the trough 15.

This provision for flexibility necessitates the placing of a lining 23 in the trough to hold oil therein, which lining may be of any oil-impervious material which may be bent, such as lead.

The trough 15 is shown as extended at 24 beyond the end of the journal 17 in order that the supply of oil may be inspected and readily renewed by pouring the same into the extended end.

In the placing of the lubricator, it is convenient to have the rear end held upwardly while it is slid back into place, and to this end there is shown a flat spring device 25 which bears against the bottom wall of the journal box and which may be desirably secured to the bottom wall of the trough as by a spot weld 26.

To seal the opening 27 in the journal box, which opening is required to be of a size to admit the flanged end 28 of the journal, there is provided in accordance with the invention a sealing member 29 which is crescent like in outline and which is provided with bowed springs 30 on one or both sides thereof.

To hold the seal 29 up against the journal, there is shown a spring 31 which may be a flattened frustum of a cone, as indicated in Figure 2, where it is shown in side elevation.

In the form of the invention shown in Figure 3, the bowed springs 32 are continuous about the lower side of the journal and the absorbent pad 33 has projections 34 passing through openings 35 in the springs to extend to the bottom of the journal box into an oil supply contained therein.

The form of Figures 5 and 6 is similar to that of Figures 3 and 4 with the exception that the spring members 36 are made of wire continuous below the journal, and which may be made of a single piece of wire if the top cross members 37 upon one side of the journal are alternated with the members 38 on the other side of the journal.

The members 37, 38 are desirably secured to the pad as at 39 by stitching and also the lower portion of the spring members may be secured in the same manner as at 40.

The form of the invention shown in Figure 7 is similar to that of Figures 1 and 2 but with the spring members made continuous at each side of the journal and integral with the trough 15'.

The spring members 41, 42, it is to be understood, will be used in combination with absorbent pads as in Figures 1 and 2, and if this form of the lubricator is placed in the journal box below the journal with the pads in place, it will snap around the journal when lifted into position and be self-supporting. This form can be used for simple and cheap installations where it is not desired to flex longitudinally to any great extent for the purpose of being introduced into the journal box.

The forms of the invention shown in Figures 8 to 11 inclusive are somewhat similar to that shown in my Patent No. 2,043,764, dated June 9, 1936, but differs therefrom in some important particulars.

As shown in Figures 8 and 9, the separate absorbent pad members 43 have legs 44 projecting to the bottom of the journal box, openings lined with metal as at 45, and spring clasps 46, all similar to that shown in my patent referred to with the difference that the clasps 46 extend well above the horizontal diameter of the journal.

As shown in Figure 8, the seal 47 supported by the spring 31 is made to support the rear end of the rod 48 passing through the openings 45.

The forward end of said rod 48 is supported by spring 49 bearing on the member 50 supported by the bar 51 attached to the horizontal rod 52 supplied with the spreader members 53 which may be expanded into contact with the side walls of the journal box.

The rod 48 is of a correct length to abut the bar 51 and also the rear wall of the journal box, and may be rigidly held lengthwise by the expansible members 54, 55, the latter abutting against the front wall of the journal box.

The seal 47 is shown as bearing upon the tapered portion 56 of the journal as well as upon a portion of the cylindrical surface 57 thereof. To hold the seal from twisting in the journal box, there is shown a plate 58 terminated in threaded rods 59, 60 provided with interiorly threaded star wheels 61, 62 and lock nut wheels 63, 64.

It may be necessary to flex the lubricator of Figure 8 to place the same in the box. A form of flexible rod for this purpose is shown at 48' in Figure 11. When such flexible rod is utilized with support only at the ends of the lubricator, a rigid support which may be inserted later may be utilized in the form of a rod 65 supported at its rear end in a loop 66 fastened to the metal lining 67 of the opening 45 and supported at the forward end as at 68 in the member 50'.

Figure 12:
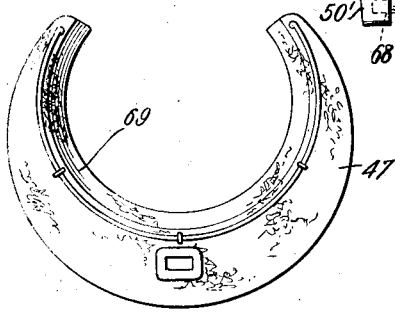
Fig. 12 is a side elevation of the sealing means shown in Fig. 8 seen from the left of said figure with other parts omitted.

In Figure 12 the seal 47 of Figure 8 is shown as seen from the right hand side of the figure showing the beveled surface 69 to fit upon the portion 56 of the journal.

Figure 13:
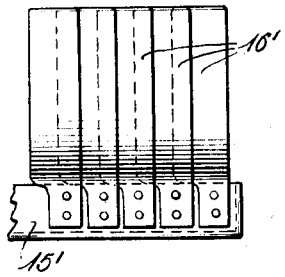
Fig. 13 is a detail side elevation of a portion of a lubricator showing telescoping spring members.
Figure 11:
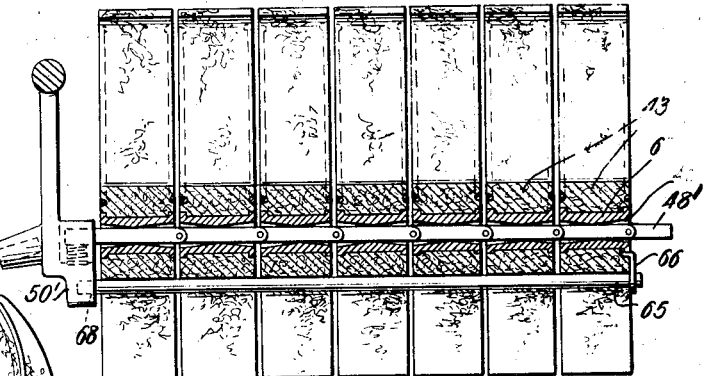
Fig. 11 is a detail central vertical section of a modification of the lubricator of Fig. 8.

In the form of Figure 13 the separate bowed spring clips 16' are shown as telescoping each with the next and as secured to the trough 15' as by rivets. It will be understood that the lower portions of the clips 16' may be made integral passing below the trough 15' so as to make opposed clips integral with each other or each clip may terminate at its portion which is secured to the trough. In this form the trough should be made of flexible or springy material in order to be longitudinally flexible.

The seal 29 or 47 is desirably formed of felt or some fibrous flexible absorbent material as its equivalent. It may also be formed of flexible non-absorbent material.

Minor changes may be made in the physical embodiments of the invention within the scope of the appended claims without departing from the spirit thereof.

I claim:

1. A journal lubricator comprising, in combination: absorbent pad means formed with opposed arcuate portions dimensioned to contact diametrically opposite surfaces of a journal from positions substantially above the horizontal diameter to positions adjacent the lower surface thereof; resilient clasp means substantially coextensive with said arcuate portions circumferentially thereof and in normal unexpanded condition formed on radii less than the radius of the journal; said clasp means and pad means assembled as a unit; and wick means projecting downwardly from said pad means to dip into an oil supply; whereby when expanded into engagement with a journal the lubricator unit shall be self supporting on the journal.

2. A journal lubricator comprising, in combination: an oil supply trough to extend longitudinally of and below a journal and in spaced relation to its journal box; resilient clasp-means comprising opposed portions shaped to conform to the surface of the journal, extending upwardly above the horizontal diameter of the journal to provide self-support of the lubricator upon the journal, and each formed integral at its lower portion with the walls of said trough; absorbent pad means embraced and pressed by said clasp-means against the surface of the journal; and wick means extending downwardly from said pad into said trough.

3. A journal lubricator comprising, in combination: an oil supply trough to extend below and longitudinally of a journal and in spaced relation to its journal box; a plurality of pairs of spaced bowed spring members each integral at its lower end with a side wall of said trough and of a length to extend well above the horizontal diameter of said journal; absorbent pad means embraced and pressed by said spring members against the surface of the journal; and oil conducting means extending downwardly from said pad means to dip into oil in said trough.

4. The combination of claim 3 wherein the side walls of said trough are slitted between their junctions with said spring members to provide longitudinal vertical flexibility and said trough is provided with an oil tight lining.

5. A journal lubricator comprising, in combination: a plurality of absorbent pad elements shaped to conform to a journal surface, continuous beneath the journal and having openings in said continuous portion; bowed spring means secured to each of said elements to press the same against the journal; seal means contacting the rearmost of said elements, shaped to cover the journal-receiving opening of the journal box, and having an opening in alignment with the first named openings; spring means to support said seal means; a rod passing through said first openings and entering said last named opening for support at its rear end; a member expansible into contact with the side walls of the journal box and having a portion underlying the forward end of said rod to support said pad elements; and means projecting forwardly from said member and expansible into contact with the front wall of the journal box to maintain the position of said member.

RUDOLPH W. MILLER.